Aug. 30, 1949.  S. F. HAWKINS ET AL  2,480,651
AIRPLANE WHEEL ACCELERATOR AND BRAKING DEVICE
Filed Nov. 27, 1944  2 Sheets-Sheet 1
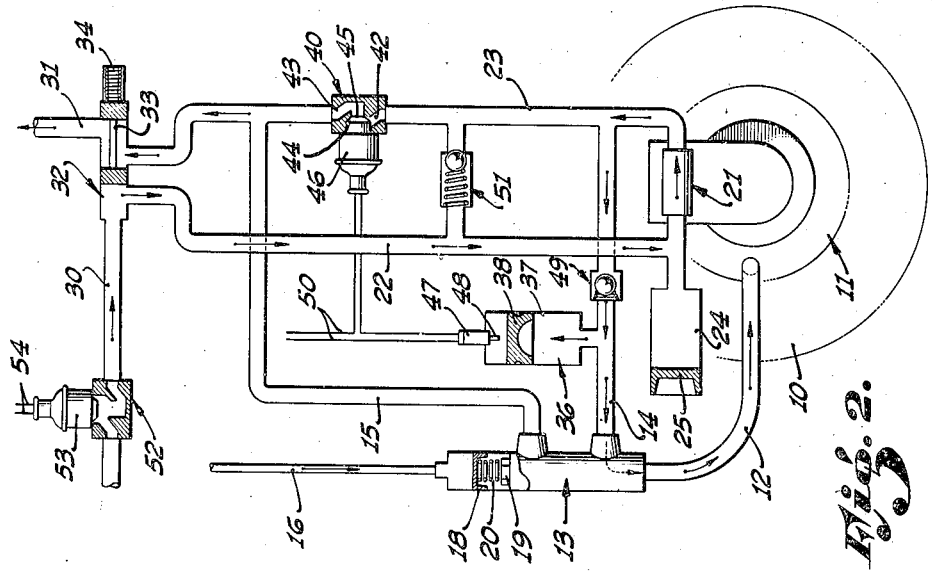
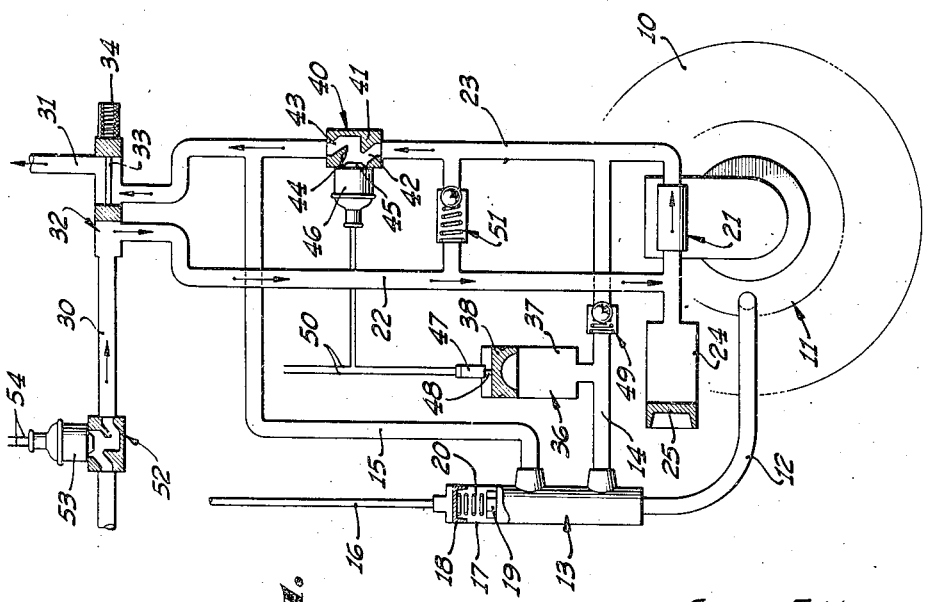
SCOTT F. HAWKINS,
CHARLES H. ROBERTS,
INVENTORS
BY Robert W. Fulwider
ATTORNEY.

Aug. 30, 1949.  S. F. HAWKINS ET AL  2,480,651
AIRPLANE WHEEL ACCELERATOR AND BRAKING DEVICE
Filed Nov. 27, 1944  2 Sheets-Sheet 2
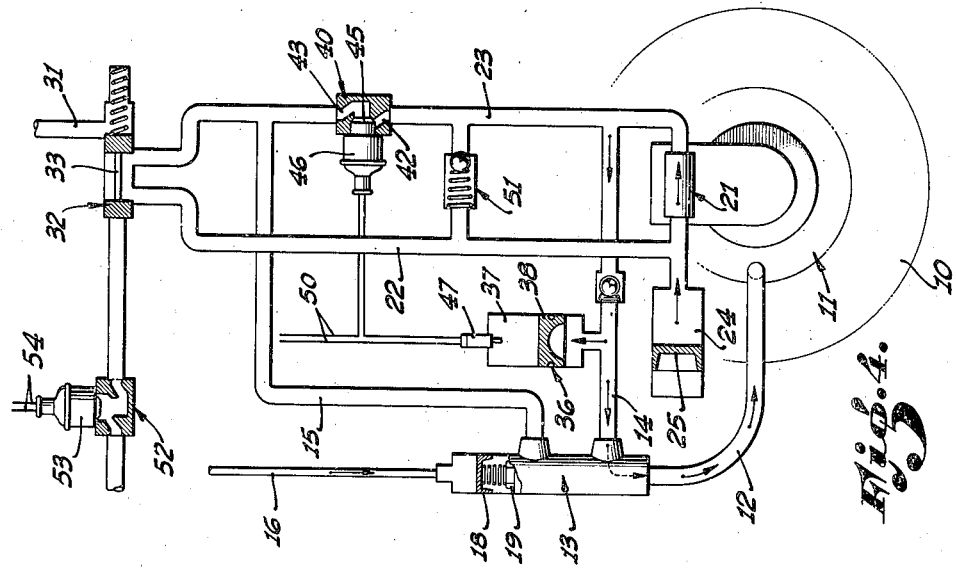
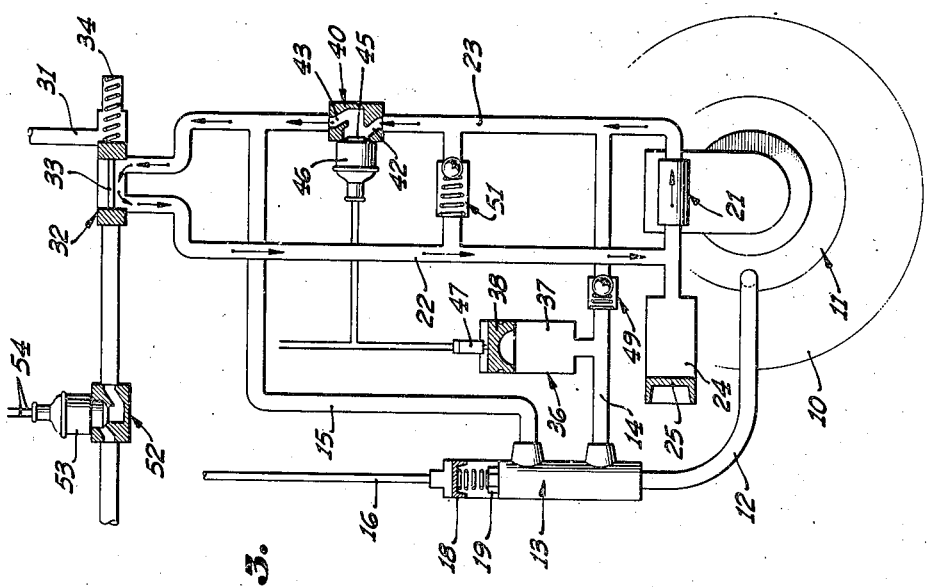
SCOTT F. HAWKINS,
CHARLES H. ROBERTS,
INVENTORS
BY
ATTORNEY.

Patented Aug. 30, 1949

2,480,651

UNITED STATES PATENT OFFICE 2,480,651

AIRPLANE WHEEL ACCELERATOR AND BRAKING DEVICE

Scott F. Hawkins, Los Angeles, and Charles H. Roberts, Burbank, Calif., assignors of one-fourth to Jack D. Lay, Burbank, and one-fourth to Charles K. Shaw, Roscoe, Calif.

Application November 27, 1944, Serial No. 565,380

9 Claims. (Cl. 244—103)

The present invention relates to airplane landing gear and more particularly to apparatus which can be operated alternatively to accelerate the wheels when the airplane is in flight or to brake the wheels when the airplane is rolling on the ground.

The principal object of this invention is to provide an improved hydraulically driven mechanism actuated from the main hydraulic system of the airplane for accelerating the wheels as the airplane makes its landing approach so that the wheel speed at the instant of contact is substantially the same as the ground speed of the airplane, thereby reducing or eliminating scuffing of the tires and the resultant stresses developed in the landing gear shock struts in overcoming the inertia of the wheels and accelerating them almost instantaneously from a standstill to ground speed. The need for such wheel accelerating apparatus is becoming increasingly more acute as the tire sizes and landing speeds of the airplanes increase and is strikingly evidenced by the plumes of blue smoke from burning tire tread thrown up behind the wheels when large, high performance airplanes touch the ground in landing. At the same time, it is essential that any wheel accelerating apparatus be as light in weight as possible, since it represents dead weight and correspondingly reduces the payload of the airplane.

Another object of the present invention, therefore, is to provide a wheel starting apparatus which can be attached to and driven from the hydraulic brake system already existing in the airplane, thereby eliminating duplication of hydraulic lines and valves with resulting weight savings and simplification of installation and servicing.

A further object of the present invention is to provide a wheel-starting apparatus which also functions as a unit brake system when the airplane is on the ground, serving as an independent and self-contained auxiliary or emergency brake in the event of failure of the main brake hydraulic system.

Still another object of the preesnt invention is to provide a unit brake system in which the power for operating the brakes is derived from rotation of the wheels on the ground and which is, therefore, not subject to failure of a power source on the airplane.

The foregoing objects are attained in the present invention by the use of a pump which is geared to the wheel, together with means for circulating fluid from the main hydraulic system of the airplane to drive the pump as a motor to rotate the wheel or, alternatively, to operate the brakes, and means for utilizing the fluid from the pump to operate the brakes independently of the main hydraulic system of the airplane.

Other objects and advantages of the present invention will become apparent to those skilled in the art after consideration of the following detailed description of the preferred embodiment thereof, reference being had to the accompanying drawings, in which:

Fig. 1 is a schematic drawing of an apparatus embodying the principles of the invention and showing the mechanism in operation to accelerate the wheel;

Fig. 2 is a similar view of the same, showing the mechanism in the condition for normal brake operation, using fluid from the main hydraulic system of the airplane to apply the brakes;

Fig. 3 is a view showing the system running free, as when the airplane is taxying along the ground with neither the brakes nor wheel rotation feature in operation; and Fig. 4 is a view showing the mechanism operating as an emergency or unit brake operation.

In the majority of the larger types of airplanes the brakes are comprised of brake shoes or disks backed up by an inflatable tube or similar expansible means which is expanded by hydraulic fluid under pressure to press the shoes or disks against the revolving brake drum or other element. Since the brakes are quite large and considerable clearance must be provided between the shoes and the drum to insure free rotation of the wheel when the brakes are released, the volume of fluid required to take up these clearances and then to operate the brakes exceeds the volume at the necessary pressure which can be delivered by master cylinders operated from the brake pedals, hence it is the usual practice to connect the brake pedals to valves which admit fluid from either the main hydraulic system of the airplane or from a brake hydraulic system provided especially for the purpose, to the brakes. In this manner, the requisite volume and pressure of fluid can be applied to the brake tubes to operate the brakes with a minimum displacement of the pedals. At the same time, the feel of the load or pressure in the brakes is obtained by virtue of a feature designed into the brake valve whereby the pressure delivered is proportional to the operating force exerted on the valve.

The present invention is adapted to be used in connection with braking systems of the above-described type, and reference is had now to the drawings, in which the numeral 10 designates an airplane wheel having a brake assembly, indicated at 11, which is served by a hydraulic line 12. The line 12 is connected to a brake valve 13 which is connected to a pressure line 14 and to a return line 15. The brake valve 13 is of the proportional pressure, or load feel type, and is actuated hydraulically by pressure fluid transmitted through line 16 from a master cylinder (not shown) operatively connected to the brake pedals in the pilot's cabin. The valve 13 is provided with a cylindrical bore 17, and slidably disposed within this bore is a piston 18 and a valve member 19. A compression spring 20 is arranged between piston 18 and valve member 19, providing a resilient connection between these elements giving a deflection of the brake pedal proportional to the force applied thereto. This is necessitated by the fact that the total travel of member 19 between its extreme positions is only a fraction of an inch, during which travel the resistance to further motion increases rapidly, giving rise to a feeling of unyielding rigidity. The spring 20, however, provides a desirable amount of brake pedal deflection, enabling the pilot to secure a finer degree of control over the brakes than could otherwise be had. When the valve member 19 is displaced downwardly, fluid from line 14 is admitted to line 12, the pressure in line 12 being proportional to the force applied to member 19. When the brakes are released, fluid in the brake tubes is discharged back through valve 13 and out the return line 15.

Mounted on any suitable stationary structure such as the brake housing 11 is a hydraulic pump 21 which is geared to the wheel 10 by gearing (not shown), and which also functions as a motor when pressure fluid is admitted to it. A friction clutch or other overload release mechanism should be provided in the driving connection between the wheel and the pump to cushion the latter against the sudden shock loads that are obtained when the wheel strikes the ground in landing and is accelerated almost instantaneously from whatever rotational speed had been reached, up to the actual ground speed of the airplane. An inlet line 22 is connected to one side of the motor 21, and a discharge line 23 is connected to the other side thereof. A reservoir tank 24 is connected to the inlet line 22 to supply hydraulic fluid to the pump 21 when the system is functioning as a unit brake, as will be described more fully hereinafter. The tank 24 may be of any conventional type, and in the drawings is shown as a cylinder with a piston 25 slidable therein, said piston being preferably urged to the right by compressed air or a light spring (not shown) in the left-hand end of the cylinder.

The inlet line 22 and discharge line 23 are connected to a high pressure line 30 and return line 31, respectively, through a transfer valve 32, the function of which is to close off the unit brake system from the main hydraulic system of the airplane when the unit brake system is in operation or running free. As shown in the drawings, the transfer valve 32 comprises a spool 33 which is urged to the left by a spring 34, the normal position of the spool being at the left-hand end of the valve, or centered with respect to lines 22 and 23, as shown in Figs. 3 and 4.

An accumulator 36 is provided in the system for the purpose of supplying fluid to the brake valve 13. The accumulator 36 may be of any well known type, and is illustratively shown as a cylinder 37 connected at its lower end into line 14 and having a piston 38 slidably arranged therein. The portion of the cylinder below the piston is filled with hydraulic fluid, while that portion above the piston is filled with compressed air at the operating pressure for the system.

A shut-off valve 40 is provided in the line 23 and is schematically shown as comprising a housing 41 having offset passages at 42 and 43 which open into a transverse bore with a seat at 44 between said passages. A valve plug 45 is arranged to seat on the valve seat 44 and is normally held open by a spring or other means (not shown), said valve plug being closed by a solenoid 46 which is actuated by a switch 47 carried on the accumulator 36. The switch 47 functions to close the valve 40 whenever the accumulator is in a partially discharged condition, and is shown as having a plunger 48 which extends into the accumulator and is engaged by the piston 38 when the latter is at the top of the cylinder 37. In this condition, the circuit of the switch is open and valve 40 is open. As the accumulator discharges and the piston 38 moves down, releasing the plunger 48, the circuit of the switch 47 is closed, actuating the solenoid 46 to close valve 40. Wires 50 carry the current from the electrical system on the airplane to the switch 47 and solenoid 46. It is also contemplated that a pressure-responsive switch might be used in the line 14 to actuate the solenoid 46, in place of the switch 47, such a switch being set to close the circuit whenever the pressure in the line drops below a predetermined value due to the discharge of fluid from the accumulator.

The return line 15 from brake valve 13 is connected into line 23 between the shut-off valve 40 and the transfer valve 32, while the pressure line 14 connects into line 23 below the shut-off valve 40. A check valve 49 is arranged in the section of line between the accumulator 36 and line 23 to prevent discharge of the accumulator back through the system. A relief valve 51 is provided in line 23 below the shut-off valve 40 and empties into line 22 to protect the system against excessive pressures which might be developed if the shut-off valve 40 should fail to open properly while the pump 21 is functioning.

Control means are provided for energizing the system to accelerate the wheels and to actuate the brakes, such control means being preferably in the form of a valve 52 arranged in the line 30. The valve 52 may be of any well known type and may be manually or electrically controlled. We prefer to use an electrically controlled valve similar to valve 40 which may be actuated either simultaneously with the extension of the landing gear or by limit switches when the gear has been fully extended. Valve 52 is identical to valve 40 but with the exception that it is normally closed at all times, being opened by the solenoid 53 when its associated switch (not shown) is actuated. Electrical wires 54 transmit the energizing current from the switch to the solenoid.

The operation of the system is as follows: Referring first to Fig. 1, and assuming that the airplane is approaching the field for a landing, the wheels are lowered in the usual manner, actuating the solenoid 53 and thereby opening the valve 52, admitting hydraulic fluid under pressure to line 30. The pressure of the fluid against the end of transfer valve spool 33 moves the latter to the right against the spring 34, admitting fluid to line 22 and driving the motor 21 to accelerate the wheel 10. Exhaust fluid from the motor 21 discharges into line 23, through shut-off valve 40 and transfer valve 32 to the return line 31, as indicated by the arrows. At the same time, the reservoir tank 24 is refilled, if not already full to capacity, by the excess of available fluid over that required to drive the motor 21. If the accumulator 36 should be in a partially discharged condition when the valve 52 is opened, the action of the switch 47 will cause the shut-off valve 40 to be closed, and back pressure in line 23 will unseat check valve 49, recharging the accumulator. As the accumulator becomes fully charged, switch 47 is actuated, opening the shut-off valve 40 and returning the flow of exhaust fluid to return line 31.

When the airplane has landed and is rolling on the ground, the brake pedals are depressed by the pilot, actuating the associated master cylinders, and pressurizing the fluid in line 16. The normal brake operating sequence is illustrated in Fig. 2, to which reference is now made. Piston 18 in the brake valve 13 is forced downwardly by the fluid in line 16 and its pressure is transmitted to the valve member 19 by spring 20. Depression of the valve member 19 opens ports (not shown) within the valve admitting fluid from the accumulator 36 to line 12 thereby operating the brakes 11. As the accumulator discharges, the piston 38 moves down, operating the switch 47 and closing the shut-off valve 40. The back pressure created in line 23 by the closing of valve 40 unseats check valve 49, circulating the fluid as indicated by arrows. When the brake tubes become inflated and the flow of fluid through line 12 diminishes to zero, the accumulator 36 is then recharged, moving the piston 38 up to the top of the cylinder and actuating the switch 47 to open the shut-off valve 40. The fluid discharged by motor 21 thereafter passes through valves 40 and 32 and out through return line 31 to the main reservoir tank of the airplane hydraulic system. As the accumulator discharges, due either to leakage or to successive operation of the brakes, piston 38 moves down in its cylinder, actuating the switch 47 to close the shut-off valve and thereby recharge the accumulator.

When the airplane is taxying on the ground with the valve 52 closed and no pressure in line 30, the transfer valve spool 33 is moved to the left by spring 34, as shown in Fig. 3, and in this centered position the circulation of the fluid in the system is as indicated by the arrows. In this condition, the pump 21 sucks fluid from line 22 and discharges it into line 23; the transfer valve 32 returning the fluid from line 23 to line 22.

If the main hydraulic system of the airplane should fail for any reason, the present system then functions as a unit brake, which condition is illustrated in Fig. 4. Inasmuch as there is now no available pressure at line 30, the spool 33 of the transfer valve remains in its centered position, as shown. The brakes are now operated in the same manner as described in connection with Fig. 2 except that the accumulator is supplemented and recharged by fluid delivered by the pump 21 which is driven by the wheel 10. The pump 21 now sucks fluid from the reservoir tank 24 and, in addition, any fluid passed by the valve 13 through line 15. As in the previously described instance, the partial discharge of the accumulator 36 during the initial period of brake operation closes the shut-off valve 40, whereupon the check valve 49 is unseated and fluid is again circulated as indicated by arrows.

It is believed a full understanding of the invention will be had from the foregoing, but it is to be understood that the drawings and description are to be considered merely as illustrative of and not restrictive on the broader claims appended hereto, for various changes in design, structure and arrangement may be made without departing from the spirit and scope of said claims.

We claim:

1. In an apparatus of the character described including, a wheel having hydraulic brakes associated therewith, an hydraulic system comprising: a fluid pump having a driving connection with said wheel, inlet and discharge lines connected to said pump, a source of hydraulic pressure connected to said inlet line, a brake valve operative to deliver fluid to said brakes to actuate the same, an accumulator connected to said brake valve to supply fluid thereto, a normally open shut-off valve in said discharge line, and means actuated by said accumulator to close said shut-off valve when the accumulator is in a partially discharged condition whereby fluid from the discharge line is admitted to said accumulator to recharge the same.

2. In an apparatus of the character described for use in an aircraft having a wheel with a hydraulic brake associated therewith, an hydraulic system comprising a source of hydraulic pressure including a high pressure line and a return line, a fluid pump having a driving connection with said wheel, inlet and discharge lines connected to said pump, valve means connected to said inlet and discharge lines and to said high pressure and return lines, respectively, said valve means being responsive to pressure in the high pressure line to admit fluid from the high pressure line to the inlet line and from the discharge line to the return line, a brake valve operative to admit fluid to said brake to actuate the same, an accumulator connected to said brake to supply fluid thereto and connected to said discharge line, and means operative to close said discharge line from said return line when said accumulator has become patially discharged whereby fluid from the discharge line is admitted to the accumulator to recharge the same.

3. In an apparatus of the character described, a wheel having hydraulic brakes associated therewith, an hydraulic system comprising: a fluid pump having a driving connection with said wheel, inlet and discharge lines connected to said pump, a brake valve operative to deliver fluid to said brakes to actuate the same, an accumulator connected to said brake valve to supply fluid thereto, a reservoir tank connected to said inlet line to supply fluid to said pump, and means responsive to the discharge of fluid from said accumulator for admitting fluid from said discharge line to the accumulator to recharge the same.

4. In an apparatus of the character described for use in an aircraft having a wheel with a hydraulic brake associated therewith, the hydraulic system comprising: a source of hydraulic pressure including a high pressure line and a return line, a fluid pump having a driving connection with said wheel, inlet and discharge lines connected to said pump, valve means operative in one position to circulate fluid from said discharge line to said inlet line, and in the other position to circulate fluid from said high pressure line to said inlet line and from said discharge line to said return line, means yieldingly urging said valve means to said one position, said valve means being movable to said other position responsive to pressure in said high pressure line, a brake valve operative to admit fluid to said brake to actuate the same, an accumulator connected to said brake to supply fluid thereto and connected to said discharge line, and means operative to close said discharge line from said return line when said accumulator has become partially discharged whereby fluid from the discharge line is admitted to the accumulator to recharge the same.

5. In an aircraft including a main hydraulic system and a supporting wheel with hydraulic brakes and a hydraulic pump, a hydraulic system for the acceleration of a wheel before landing and for the braking thereof comprising: interconnected fluid passages including the main hydraulic system of the aircraft, a wheel-actuated pump, and fluid conduits therebetween; fluid-conducting means connected to said passages and to the brakes of said wheel; and valve means selectively controlling the flow of fluid under pressure from said main hydraulic system to said pump and to said brakes.

6. In an aircraft having a main pressurized hydraulic system and a supoprting wheel with hydraulic brakes, a hydraulic system to apply said brakes and to accelerate said wheel, comprising: first fluid passages including the main hydraulic system of the aircraft, a wheel actuated pump, and fluid conduits therebetween; second fluid passages connecting said first fluid passages to the hydraulic brakes of said wheel to conduct fluid to said brake under the pressure of said main hydraulic system and under the pressure exerted by said pump.

7. The construction recited in claim 6 characterized in that valve means are provided in said first fluid passages to prevent a flow of fluid from said pump to said main hydraulic system and to direct that flow to said hydraulic brakes.

8. The construction recited by claim 6 characterized in that a fluid pressure accumulator is positioned in said passages to deliver fluid under pressure to said hydraulic brakes.

9. The construction recited in claim 6 characterized in that means are provided to seal off said main hydraulic system upon the failure of pressure therein.

SCOTT F. HAWKINS.
CHARLES H. ROBERTS.

REFERENCES CITED

The following references are of record in the file of this patent:

UNITED STATES PATENTS

| Number | Name | Date |
|---|---|---|
| 1,008,202 | Schmucker | Nov. 7, 1911 |
| 1,207,801 | Schmidt | Dec. 12, 1916 |
| 1,749,495 | MacPherson | Mar. 4, 1930 |
| 2,317,846 | Campbell | Apr. 27, 1943 |
| 2,365,126 | Vickers et al. | Dec. 12, 1944 |

FOREIGN PATENTS

| Number | Country | Date |
|---|---|---|
| 573,302 | France | Mar. 7, 1924 |
| 840,641 | France | Jan. 23, 1939 |

Certificate of Correction

Patent No. 2,480,651 August 30, 1949

SCOTT F. HAWKINS ET AL.

It is hereby certified that errors appear in the printed specification of the above numbered patent requiring correction as follows:

Column 6, line 42, for "patially" read *partially*; line 46, before the words "a wheel" insert *including*; column 7, line 21, for "supoprting" read *supporting*; and that the said Letters Patent should be read with these corrections therein that the same may conform to the record of the case in the Patent Office.

Signed and sealed this 17th day of January, A. D. 1950.

[SEAL]

THOMAS F. MURPHY,
*Assistant Commissioner of Patents.*